US008308070B2

(12) United States Patent
Vonmetz et al.

(10) Patent No.: US 8,308,070 B2
(45) Date of Patent: Nov. 13, 2012

(54) SYSTEM FOR AUTOMATICALLY ACQUIRING OPTICALLY CODED INFORMATION, ILLUMINATOR FOR SAID SYSTEM AND METHOD FOR ALIGNING WITH EACH OTHER OPTICAL COMPONENTS OF THE SYSTEM

(75) Inventors: Kurt Vonmetz, Bologna (IT); Fabrizio Guastadini, Bologna (IT); Luigi Pellegrino, Nardo (IT); Daniele Fiorini, Casalecchio di Reno (IT)

(73) Assignee: Datalogic Automation S.R.L., Monte San Pietro, Bologna (IT)

( * ) Notice: Subject to any disclaimer, the term of this patent is extended or adjusted under 35 U.S.C. 154(b) by 160 days.

(21) Appl. No.: 12/936,595

(22) PCT Filed: Apr. 17, 2008

(86) PCT No.: PCT/IB2008/000948
§ 371 (c)(1),
(2), (4) Date: Oct. 6, 2010

(87) PCT Pub. No.: WO2009/127890
PCT Pub. Date: Oct. 22, 2009

(65) Prior Publication Data
US 2011/0031315 A1    Feb. 10, 2011

(51) Int. Cl.
*G06K 7/10* (2006.01)
(52) U.S. Cl. .................... 235/462.42; 235/454
(58) Field of Classification Search .................. 235/454, 235/462.01
See application file for complete search history.

(56) References Cited

U.S. PATENT DOCUMENTS

| 4,408,120 | A | 10/1983 | Hara et al. |
| 4,589,738 | A * | 5/1986 | Ozaki ........................... 359/729 |
| 5,623,137 | A | 4/1997 | Powers et al. |
| 6,357,661 | B1 * | 3/2002 | Schonenberg et al. .. 235/462.36 |
| 6,435,411 | B1 | 8/2002 | Massieu et al. |
| 6,978,935 | B2 | 12/2005 | Tsikos et al. |
| 6,998,935 | B2 | 2/2006 | Jain et al. |

FOREIGN PATENT DOCUMENTS

| EP | 0571891 A2 | 12/1993 |
| EP | 0697674 A | 2/1996 |
| EP | 0785452 A1 | 7/1997 |
| EP | 1067361 A1 | 1/2001 |
| EP | 1345157 A1 | 9/2003 |

OTHER PUBLICATIONS

International Search Report dated Sep. 30, 2008 from corresponding International Application No. PCT/IB2008/000948.

* cited by examiner

*Primary Examiner* — Thien M Le
*Assistant Examiner* — Christopher Stanford
(74) *Attorney, Agent, or Firm* — Duane Morris LLP (57) ABSTRACT

An illuminating device for a system for automatically acquiring optically encoded information includes at least one illuminating element, the at least one illuminating element including at least one linear light source extending along a first direction, at least one reflecting optical element associated with the at least one linear light source and suitable for reflecting a light beam emitted by the at least one light source, the optical element having at least one first focus, the linear light source being arranged within an area surrounding the first focus, the illuminating device further includes rotating means suitable for rotating the at least one reflecting optical element with respect to the at least one first focus, with a rotation center arranged within a further area surrounding the at least one first focus.

22 Claims, 5 Drawing Sheets

SYSTEM FOR AUTOMATICALLY ACQUIRING OPTICALLY CODED INFORMATION, ILLUMINATOR FOR SAID SYSTEM AND METHOD FOR ALIGNING WITH EACH OTHER OPTICAL COMPONENTS OF THE SYSTEM

FIELD OF THE INVENTION

The present invention relates to a system for automatically acquiring optically encoded information, in particular a system for acquiring images of optical codes, an illuminator for said system and a method for the reciprocal alignment of the optical components of said system.

BACKGROUND

In the continuation of the present description and in the subsequent claims, the expression "optical code" is used to indicate any graphic representation having the function of storing encoded information by means of suitable combinations of elements with a preset shape, for example square, rectangular or hexagonal, of a dark colour (normally black) separated by clear elements (spaces, normally white), such as barcodes, stacked codes, i.e. codes with several sequences of superimposed bars and two-dimensional codes in general, colour codes, etc, and alphanumeric characters. The term "optical code" comprises graphic representations that are detectable not only in the field of visible light but also in the wavelength field comprised between infrared and ultraviolet.

Systems for automatically acquiring optically encoded information are known from the prior art, in particular systems for acquiring said information via images. Such systems comprise a unit for optically acquiring images and a unit for electronically processing said images.

The optical acquisition unit comprises an illuminator that projects a light beam onto the support where the optically encoded information is applied, an image-acquiring device that comprises an objective lens that forms an image of the Support and a sensor, which is arranged at the plane where the image is formed, or image plane, inside said image-acquiring device; typically, the sensor is arranged on a plane that is perpendicular to the optical axis of the objective lens, but there exist cases in which the plane of the sensor can be tilted with respect to said axis by a preset angle. The image formed on the sensor is transferred to an electronic processing unit by a suitable interface circuit; the electronic processing unit processes the image signal, extracting from the image the information encoded on the support. The optical acquisition unit may also comprise optical tracking systems, such as those disclosed in EP 1 345 157 A1, for measuring the distance from the sensor to the support, such as those disclosed in EP 1 067 361 A1, for automatic adjustment of the focusing of the objective lens, such as those disclosed in EP 0 785 452 A1. In most cases, there are also one or more deflecting mirrors. These components can be housed in a common container or in distinct containers.

The deflecting mirror, or the deflecting mirrors, enable the installation of the equipment for acquiring optically encoded information to be optimised from the point of view of space requirements with respect to the support where the optically encoded information is applied and then directing the field of view of the sensor and possibly also the light beam emitted by the illuminator to the desired area.

In the known systems the sensor is an array of photosensitive, linear or matrix elements, hence the name of the linear or matrix image acquisition system; in the former case the image is acquired by successive lines, in the second simultaneously on an area. In linear acquisition systems based on a linear sensor it is requested to concentrate the light emitted by the illuminator on a stripe coinciding with the field of view of the sensor.

In applications in which such acquisition systems are used, the system is fixed to a supporting structure and the support to which the information is applied, typically a pack, an envelope, a package, etc, is moved with respect to the system, for example by a conveyor belt. The greater the transit speed of the support, the faster the acquisition by the sensor has to be, or the shorter the exposure time has to be.

In linear acquisition systems known from the state of the art the main problem is to generate an extremely thin and concentrated light stripe so as to maximise the intensity of the signal received by the sensor, reducing the exposure time and permitting the image of the support to be "frozen" even when it is moving with respect to the acquisition system at relatively high speeds. On the other hand, the thinner the light stripe, the more difficult is the operation of mutual alignment between the illuminator and sensor; even a slight misalignment between the sensor and the illuminator means causes the field of view of the sensor to fall outside the peak of intensity of the light stripe, reducing the efficiency of the system and wasting most of the light emitted. A similar effect occurs if the light stripe is rotated with respect to the line of view of the sensor.

This problem is addressed by the systems of the prior art in an unsatisfactory manner.

EP 0 571 891 B1 discloses a linear acquisition system with a linear illuminator comprising a high-power sodium-vapour lamp, emitting on a line, and an optical element consisting of an elliptic reflector, the sodium lamp being placed near a focus of said ellipse; in this manner an image of said linear source is formed in the other focus of the ellipse, corresponding approximately to the position in which there is the support containing the optical information. The inventor states that this system requires no adjustment owing to the extreme precision of the manufacture of the supports for the lamp and the reflector so that the line of view of the sensor and the light stripe always overlap. In fact, this is true because the sodium lamp forms an image that is not very concentrated but is rather extended on quite a wide stripe, being a source that extends also in the direction that is orthogonal to the linear development of the source; in this case, the normal work tolerances are sufficient to guarantee a good overlap between the light stripe and the field of view of the sensor even in the event of slight misalignment. Further, the described solution discloses an illuminator that is constructed as a single block, that extends over the entire width of the field of view of the sensor, so even a small angular misalignment of the sensor, due to the length, results in a loss of efficiency at the ends of the sensor, which may even be significant, having a peak of intensity at only one point of the sensor and possibly null intensity at the ends.

In addition, the disclosed system is not coaxial, so in fact the overlap between illumination and field of view of the sensor is obtained only in a zone near the second focus of the ellipse; the ability to illuminate and identify information on supports arranged at different distances from the sensor is greatly diminished thereby making ineffective any technique for increasing the depth of focus of the objective lens, such as, for example, the automatic focusing techniques mentioned above.

The emergence on the market of solid state light sources such as LEDs and semiconductor lasers that are very compact and suitable for being grouped in linear bars has provided the designer with a class of sources that is able to focus a much thinner stripe, if combined with a suitable optical system. Simply replacing these sources inside the previously disclosed device makes it impossible to be carried out because the mechanical tolerances alone are not able to ensure the required alignment, and the greater concentration of light would further reduce the reading depth of the system.

Some of these drawbacks, but not all these drawbacks, are solved by a system like the one shown in U.S. Pat. No. 6,978,935, in which a system is disclosed in which the illuminator is divided into two linear sections, each comprising an array of semiconductor lasers, said sections being arranged laterally to the objective lens and emitting on a plane overlapping the field of view of the sensor. The compactness of the sources enables a very thin stripe to be generated, the coplanarity with the field of view of the sensor significantly extends the reading depth of the system, but the problem of alignment is increased. In fact, an independent adjustment is provided for each laser source for the alignment so as to align the single linear section, and a further adjustment that aligns the two sections with one another and with the sensor. This is a costly and complicated system, that attempts to compensate for each orientation error of the source with rectilinear and rotation movements on different axes; as each subsequent adjustment around an axis different from the first axis influences the preceding adjustment, not necessarily in the sense of an improvement, the risk is to be forced to perform an interactive procedure in which, once the illuminator has been adjusted on an axis, it is necessary to go back and correct the calibration on the preceding axis.

The present invention intends to remedy the aforesaid drawbacks.

SUMMARY OF THE INVENTION

According to the present invention an illuminating device is provided for a system for automatically acquiring optically encoded information comprising at least one illuminating element, said at least one illuminating element comprising at least one linear light source extending along a first direction, at least one reflecting optical element associated with said at least one linear light source and suitable for reflecting a light beam emitted by said at least one light source, said optical element having at least one first focus, said linear light source being arranged within an area surrounding said first focus, characterised in that it comprises rotating means suitable for rotating said at least one reflecting optical element with respect to said at least one first focus, with a rotation centre arranged within a further area surrounding said at least one first focus.

Owing to the invention it is possible to obtain an optimal alignment between the line of view of the optical sensor and the light beam emitted by the light source so as to maximise the light intensity of the image that is formed on the optical sensor.

According to a further aspect of the present invention a system is provided for acquiring images that comprises an illuminating device as defined above.

According to a still further aspect of the present invention there is provided a method for aligning a system for acquiring images, said system comprising an image-acquiring device and an illuminating device, said image-acquiring device comprising an optical sensor and an objective lens that is suitable for forming an image on said optical sensor, said method comprising the steps of:

illuminating with a light beam, by said illuminating device, a support suitable for diffusing said light beam;

forming an image of said support on said optical sensor;

detecting a light intensity of said image, by said optical sensor, characterised in that it further comprises the step of:

rotating a reflecting optical element of said illuminating device around a centre placed within an area surrounding at least one first focus of said reflecting optical element until said light intensity is maximised.

BRIEF DESCRIPTION OF THE DRAWINGS

The invention will be disclosed below merely by way of non-limiting example, with reference to the enclosed drawings, in which.

DETAILED DESCRIPTION

Figure 1:
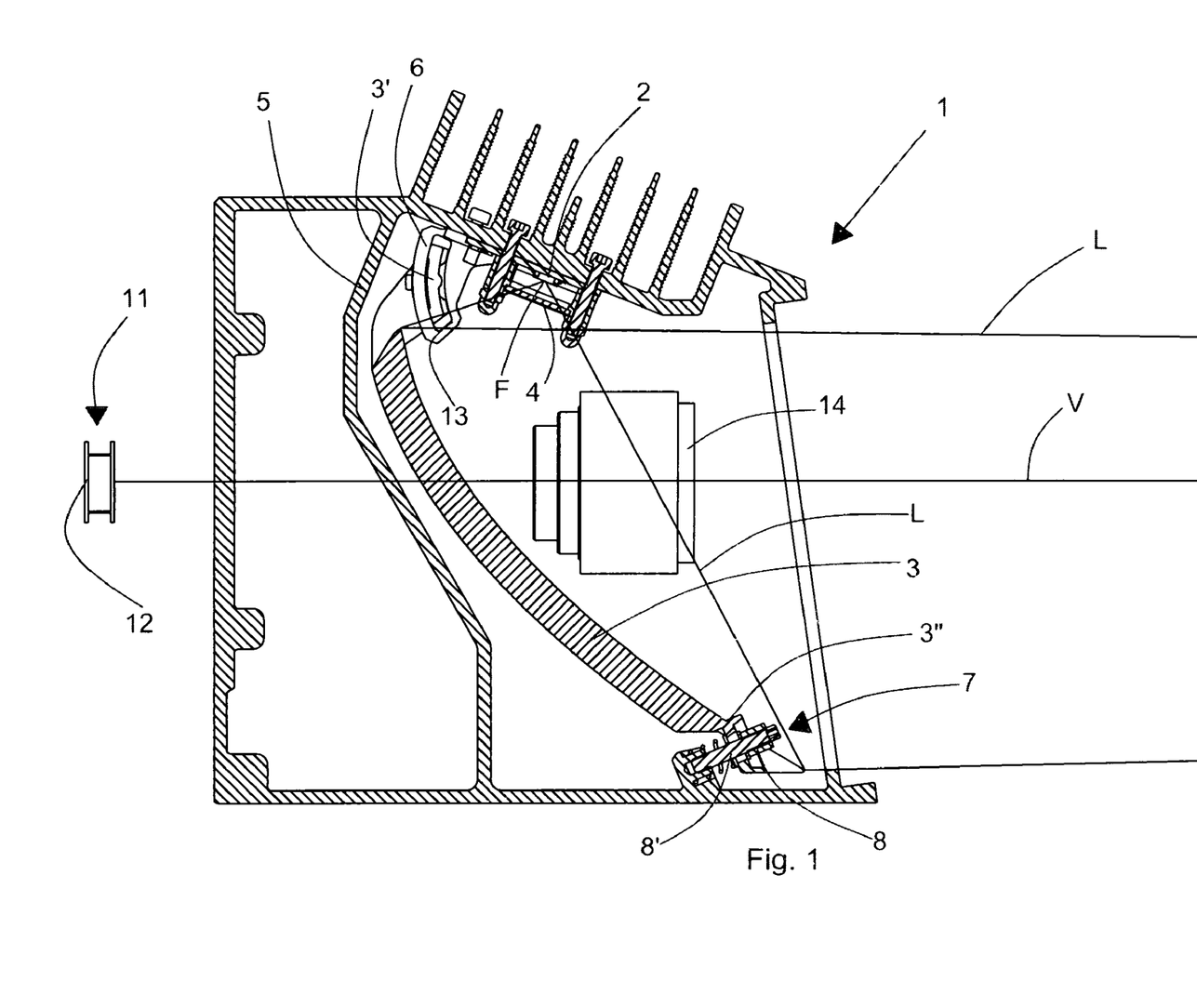
FIG. 1 is a cross-section view of an illuminating device according to the invention.
Figure 2:
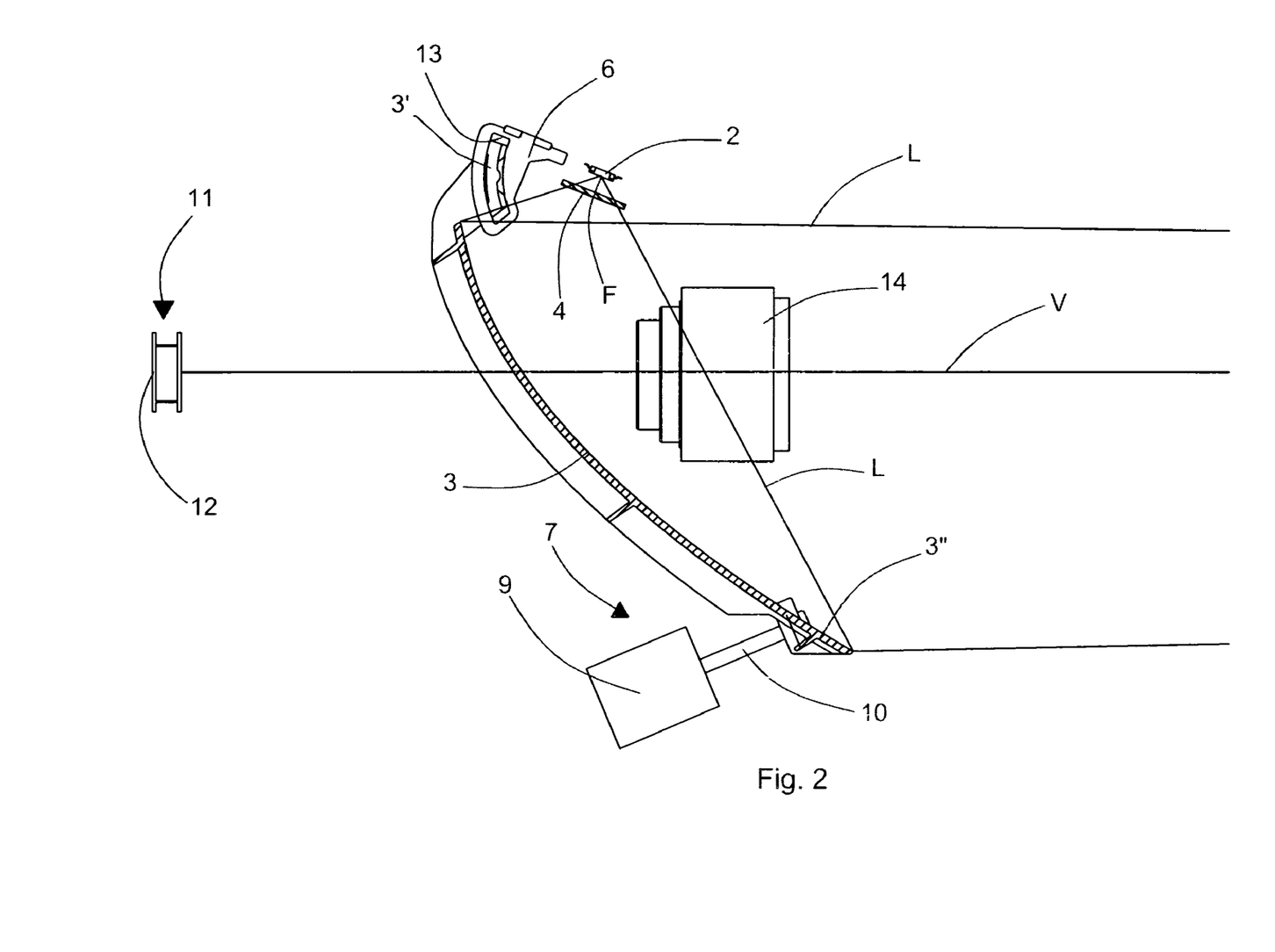
FIG. 2 is a detail of a version of the illuminating device in FIG. 1.

With reference to FIG. 1 an illuminating device according to the invention comprises at least one illuminating element 1 provided with a linear light source 2 consisting, for example, of an array of solid-state emitters, for example high-power LEDs, and extending along a first direction, a reflecting optical element 3 that receives a light beam L emitted by the light source 2 and reflects it towards a reading zone where the light is intended to illuminate an optical code impressed on an object, that has to be read by an image-acquiring device 11, for example a television camera, or camera, that comprises an objective lens 14 that forms an image of the optical code and an optical sensor 12, for example a linear sensor, that is arranged at the image forming plane, or image plane, inside said image-acquiring device 11. The reflecting optical element 3 is shaped so as to have at least one first linear focus F in an area around which the light source 2 is arranged. Between the light source 2 and the reflecting optical element 3 an array of lenses 4 can be inserted, for example cylindrical or toric Fresnel lenses, whose object is to make a partial concentration of the light beam L emitted by the light source 2, in the direction along which the linear light source extends, to increase the efficiency of the system.

In a preferred embodiment of the present invention, the reflecting optical element 3 has an elliptical shape, i.e. has the shape of an ellipsoid sector, with a second linear focus F" (FIG. 3), towards which the light beam L is focussed that is emitted by the light source 2 and reflected by the reflecting optical element 3.

The reflecting optical element 3 is connected, at a first end 3' thereof, to a supporting frame 5 by a coupling element 6 that comprises an arc-shaped slit 13 having the centre within a further area surrounding said at least one first focus F of the optical element 3. Thus a sliding of said first end 3' in the slit 13 causes the reflecting optical element 3 to rotate with respect to the at least one first focus F of the element. The reflecting optical element 3 is coupled, at a second end 3" opposite said first end 3', with an adjusting device 7, by means of which the reflecting optical element 3 can be rotated around said at least one first focus F.

The adjusting device 7 can be, for example, a manual adjusting device consisting of a manually driven adjusting nut 8, associated with a screw 8' that connects said second end 3" of the reflecting optical element 3 to the supporting frame 5. Alternatively, the adjusting device 7 can consist of a motor 9 that drives an adjusting screw 10 connected to said second end 3" of the reflecting optical element 3.

Rotating the reflecting optical element 3 with respect to the first focus F thereof is used to vary the position of the light beam L reflected by the reflecting optical element 3 in a direction that is perpendicular to the direction in which the light beam L extends. For example, if the light beam L extends in a direction parallel to a horizontal plane, rotation of the reflecting optical element 3 determines upward or downward movement, with respect to said horizontal plane, of the light beam L reflected by the reflecting optical element 3.

If the reflecting optical element 3 is of the elliptic type, i.e. is provided with a second linear focus F', a rotation with respect to the first focus F causes a movement of the second linear focus in a direction that is perpendicular to the direction along which said second linear focus F' extends and a consequent movement in said perpendicular direction of the light beam L focussed on said second focus F'.

Rotating the reflecting optical element 3 is used to adjust the height position of the reflected light beam L with respect to the line of view of the sensor 12, which position, in the case of a reflecting optical element 3 of elliptic type, coincides with the second focus F' of the reflecting optical element 3, so as to obtain the maximum light intensity at the line of view of the sensor 12, which, in the following description and in the drawings will be indicated as F'.

The line of focus of the objective lens 14 is said line of view and constitutes the projection of the sensor of the camera through the objective lens 14, at the focus distance along the optical axis V. All the lines of view (or reading lines) at the various distances allowed by the focusing system form the reading field, also called field of view, of the camera.

In an advantageous embodiment of the present invention (FIG. 3), the illuminating device 1 comprises a first illuminating element 1' and a second illuminating element 1" arranged on opposite parts of the optical axis V of the image-acquiring device 11.

Figure 3:
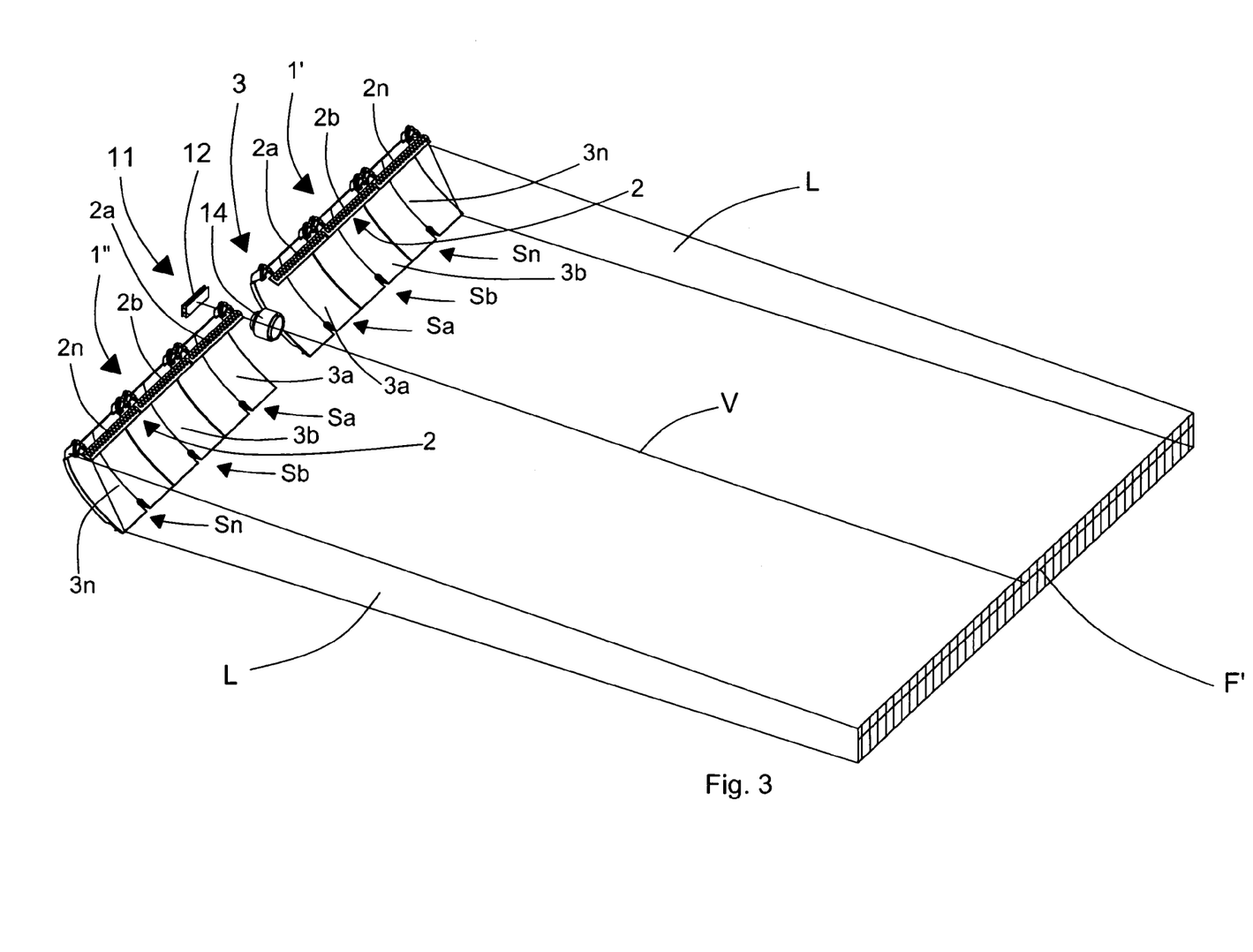
FIG. 3 is a schematic perspective view of a further variant of an illuminating device according to the invention.

Each illuminating element 1', 1" comprises at least one linear light source 2 and at least one reflecting optical element 3, the reflecting optical elements 3 being connected to the frame 5 so as to be able to rotate independently of one another with respect to the respective first focus F.

In a further preferred embodiment, each illuminating element 1', 1" is divided into a plurality of sections Sa, Sb, . . . , Sn, each of which comprises a respective light source 2a, 2b, . . . , 2n associated with a respective reflecting optical element 3a, 3b, . . . , 3n. All the reflecting optical elements 3a, 3b, . . . , 3n are connected to the frame 5 (not visible in FIG. 3) so as to be able to rotate independently of one another with respect to the respective first foci, as illustrated previously.

Figure 4:
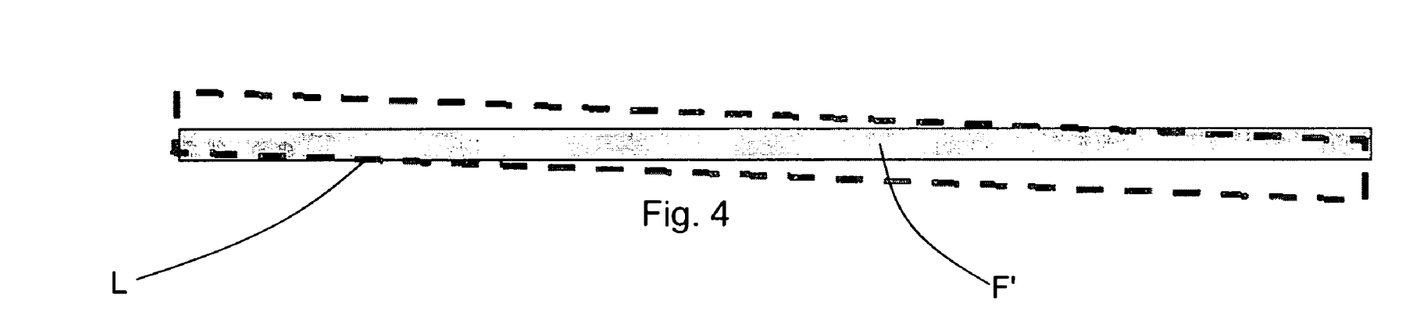
FIGS. 4, 5, 6 are diagrams that illustrate the advantages of an illuminating device according to the invention.
Figures 5, 6:
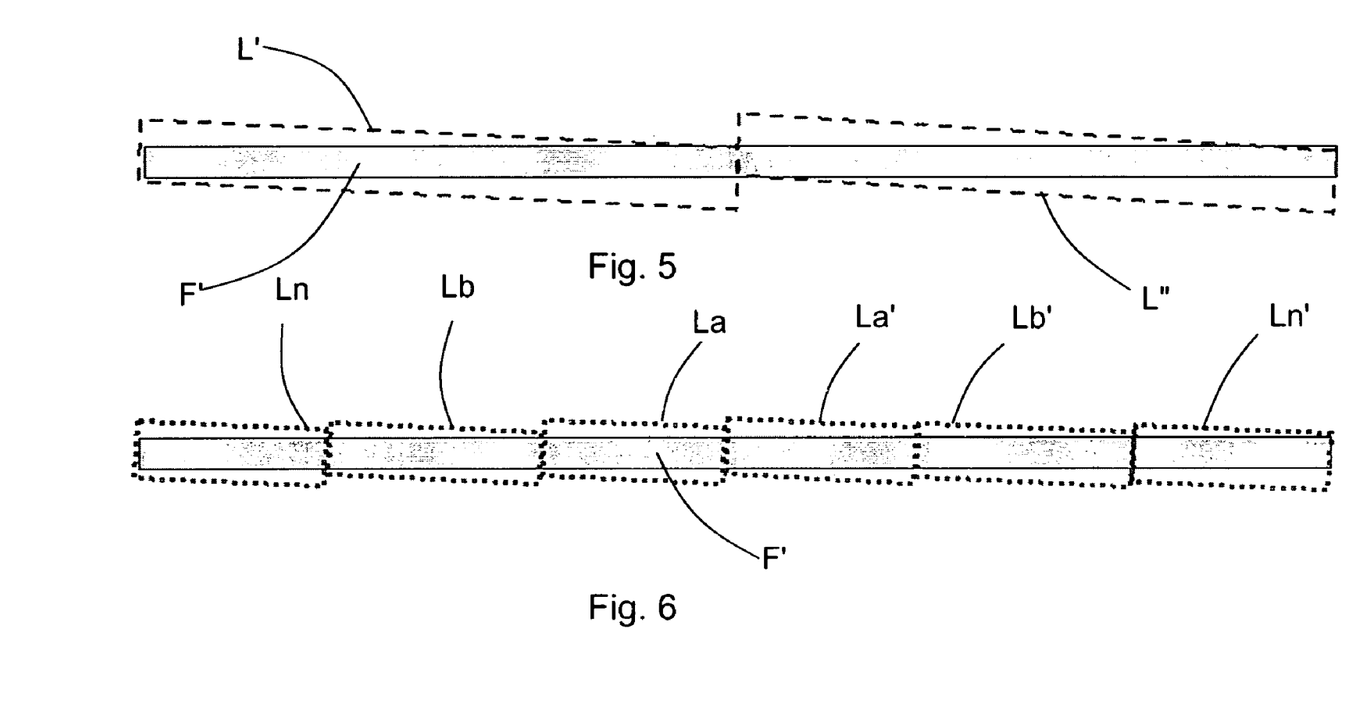

Dividing the illuminating device 1 into two illuminating elements 1', 1" arranged on opposite parts of the optical axis V and the further fractioning of each illuminating element 1', 1" into a plurality of sections Sa, Sb, . . . , Sn, enables the effects of a misalignment between the line of view V of the sensor and the light beam L reflected by the reflecting optical element 3 to be minimised, i.e. enables the effects of a possible rotation of the light beam with respect to the line of view of the sensor 12 to be minimised, as exemplified in FIGS. 4, 5 and 6, in which a continuous line indicates the line of view F' of the sensor 12 and a broken line indicates the light beam L generated by the light source 2, or the light beams La, Lb, . . . , Ln generated by the light sources 2a, 2b, . . . , 2n.

With reference to FIG. 4, which refers to the case of an illuminating device 1 having a single light source 2 and a single reflecting optical element 3, it can be seen that a rotation of the light beam L, emitted by the light source 2 and reflected by the reflecting optical element 3, with respect to the line of view of the sensor 12 means that the end zones of the line of view F' are poorly lighted.

In FIG. 5, which refers to an illuminating device comprising a first illuminating element 1' and a second illuminating element 1", each of which consists of a respective light source 2 and of a respective reflecting optical element 3, it can be seen how the lighting of the end zones of the line of view of the sensor 12 is improved compared with FIG. 4. In the Figure, L' and L" indicate the light beams coming from the two illuminating elements 1' and 1", respectively.

In FIG. 6, which refers to an illuminator 1 in which each illuminating element is divided into a plurality of sections Sa, Sb, . . . , Sn, it can be seen how the illumination of the line of view F' of the sensor 12 is substantially uniform along the entire length of the line of view F'. In FIG. 6 La, Lb, Ln, La', Lb', Ln' indicate the light beams coming form the respective sections of the illuminating elements.

It is thus obvious the advantage of dividing each illuminating element 1', 1" into several sections Sa, Sb, . . . , Sn, in each of which the respective reflecting optical element 3a, 3b, . . . 3n, can be oriented independently of the reflecting optical elements of the other sections, so as to maximise and equalize the lighting of the entire line of view F' of the sensor 12 along the entire length thereof.

The operation of orienting each reflecting optical element 3a, 3b, . . . 3n, can be performed with all the light sources 2a, 2b, . . . , 2n switched on, or with only the light source of the optical element to be oriented switched on.

It should be noted that the control of the rotation of the reflecting optical elements 3, 3a, 3b, . . . , 3n, can be automated using the light intensity perceived by the sensor 12 as a feedback signal for driving the respective motor 9 of the respective adjusting device 7 of each reflecting optical element to maximise and equalize said intensity along the entire length of the sensor, or at least on most of the length thereof. This solution is particularly useful when, during a maintenance operation, the objective lens, the sensor or an illuminator is replaced, inasmuch as it enables system realignment time to be significantly reduced, whether the operation is conducted automatically or manually, inasmuch as said signal can be used by an operator, in the case of manual adjustment of the reflecting optical elements, as a guide to calibrating the system.

It is also useful to use an image-acquiring device 11 in which the sensor 12 is orientable manually, or automatically, on the lying plane thereof, by rectilinear movement and rotation on said lying plane, in order to obtain a further improvement in the light intensity perceived by the sensor 12 and the uniformity of said light intensity along the entire length of the sensor 12.

The shape of the reflecting optical element 3 can be different from the elliptical shape provided that it is a reflecting optical element provided with at least one focus, in an area around which to place the light source 2 and the rotation centre of the reflecting optical element 3.

The position of the light source 2 and of the rotation centre of the reflecting optical element 3 is selected, as said, in an area surrounding the at least one first focus of the reflecting optical element 3.

In the case of a reflecting optical element 3 with an elliptical shape, i.e. with a first focus F and a second focus F', it is advantageous to arrange the light source 2 at a distance from said at least one first focus F that is not greater than approximately $\frac{1}{250}$ of the interfocal distance, i.e. of the distance between the first focus F and the second focus F' of the reflecting optical element 3, more preferably at a distance that is not greater than $\frac{1}{1000}$ of the interfocal distance, and the rotation centre of the reflecting optical element 3 at a distance from said first focus F that is not greater than $\frac{1}{25}$ of said interfocal distance, more preferably not greater than $\frac{1}{100}$ of said interfocal distance. In this manner the blurring of the light stripe at the focusing distances (second focus F') will not be such as to reduce the maximum intensity of the signal at the peak point thereof to values that are unacceptable from the functional point of view.

In a typical application example, the interfocal distance is 3500 mm, corresponding to the maximum reading distance, and the field of view is 1100 mm wide; in this situation, the maximum acceptable shift of the light source 2 with respect to the first focus F is 14 mm, preferably not greater than 3.5 mm; the maximum acceptable shift for the rotation centre is, on the other hand, 140 mm, for a maximum permitted rotation of ±0.25°, and preferably 35 mm, for a maximum permitted rotation of ±1.0 degrees.

Figure 7:
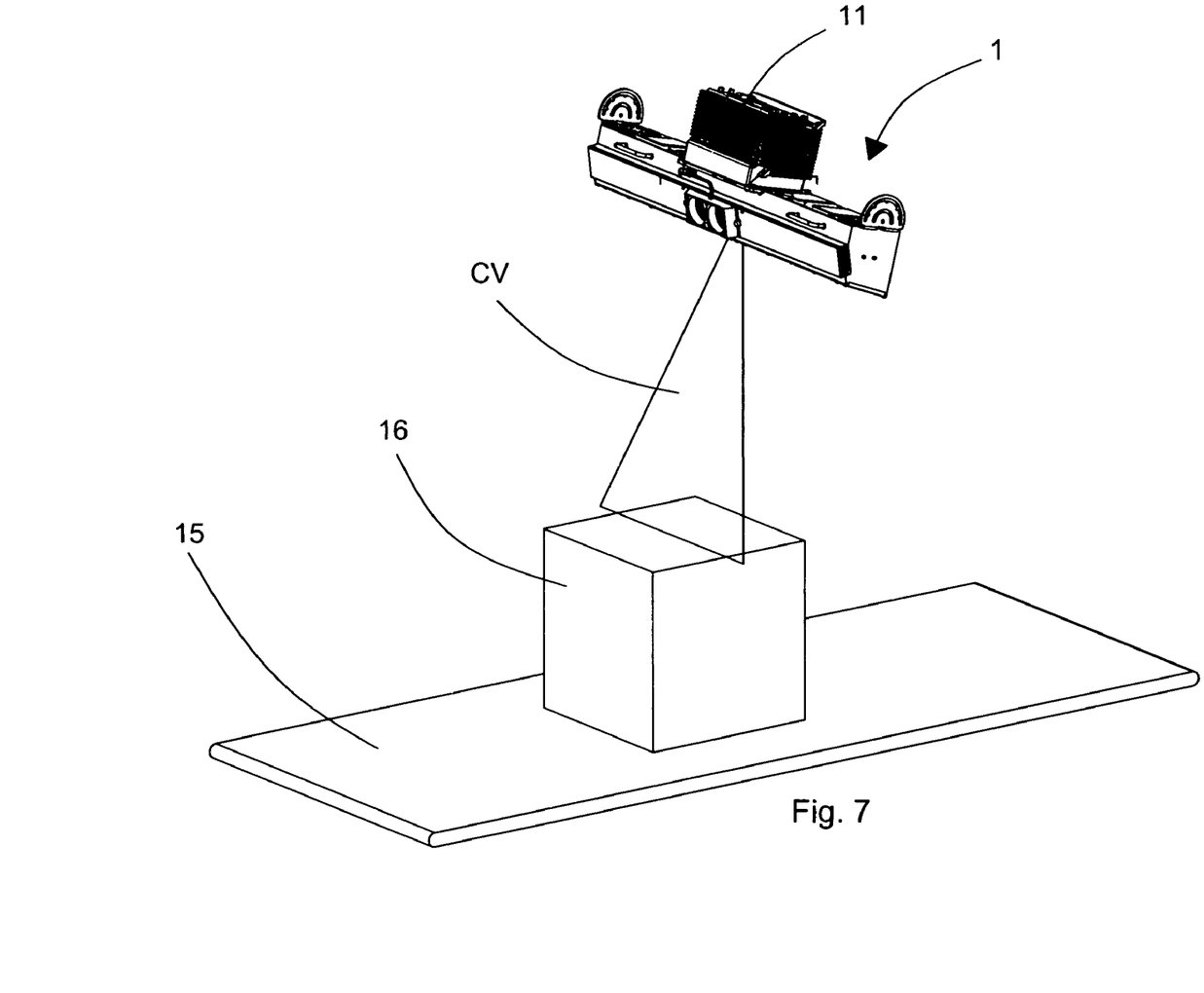
FIG. 7 is a schematic view that illustrates a device according to the invention associated with an object conveying device, for example a conveyor belt.

In FIG. 7 there is illustrated an example of use of a device 1 according to the invention associated with a conveying device 15, for example a conveyor belt, for conveying objects 16 on which optically encoded information is impressed. The device 1 according to the invention, in the illustrated example, is arranged above the conveying device 15, so as to illuminate a zone of an object 16 in transit on the conveying device 15 in which said optically encoded information is impressed, illumination occurring so as to have maximum intensity and uniformity of the light reflected by the object 16 when the optically encoded information is within the field of view CV of the image-acquiring device 11. In the practical embodiment, the materials, the dimensions and the constructional details may be different from those indicated, but be technically equivalent thereto, without thereby falling outside the scope of the present invention, as defined by the claims.

What is claimed is:

1. An illuminating device for a system for automatically acquiring optically encoded information comprising:
   at least one illuminating element, said at least one illuminating element comprising at least one linear light source extending along a first direction, at least one reflecting optical element associated with said at least one linear light source and suitable for reflecting a light beam emitted by said at least one light source, said reflecting optical element having at least one first focus, said linear light source being arranged within an area surrounding said first focus, said at least one reflecting optical element being rotatably arranged within the at least one illuminating element for rotating around a rotation centre arranged within a further area surrounding said at least one first focus, said at least one reflecting optical element having a second focus, wherein said rotation centre is arranged at a distance from said first focus that is not greater than $\frac{1}{25}$ of the distance between said first focus and said second focus.

2. The device according to claim 1, wherein a first end of said at least one reflecting optical element is connected to a supporting frame by a coupling element, said first end being movable with respect to said coupling element.

3. The device according to claim 2, wherein said coupling element comprises an arc shaped slit within which said first end is slidable, said arc shaped slit having a centre coinciding with said rotation centre.

4. The device according to claim 2, wherein a second end, opposite said first end, of said reflecting optical element is connected to an adjusting device configured to rotate said reflecting optical element around said rotation centre.

5. The device according to claim 4, wherein said adjusting device comprises a manually driven adjusting nut.

6. The device according to claim 4, wherein said adjusting device comprises an adjusting screw driven by a driving means.

7. The device according to claim 1, wherein said at least one reflecting optical element has an ellipsoid sector shape.

8. The device according to claim 1, wherein said at least one light source is placed at a distance from said first focus that is not greater than $\frac{1}{250}$ of the distance between said first focus and said second focus.

9. The device according to claim 8, wherein said at least one light source is placed at a distance from said first focus that is not greater than $\frac{1}{1000}$ of the distance between said first focus and said second focus.

10. The device according to claim 1, wherein said rotation centre is arranged at a distance from said first focus that is not greater than $\frac{1}{100}$ of the distance between said first focus and said second focus.

11. The device according to claim 1, wherein the device is associated with a device for acquiring images that is provided with an optical sensor and an objective lens that is suitable for forming an image on said optical sensor.

12. The device according to claim 11, wherein said at least one illuminating element comprises a first illuminating element and a second illuminating element arranged on opposite sides of an optical axis of said objective lens.

13. The device according to claim 1, wherein said illuminating element is divided into a plurality of sections with each of which there is associated a respective light source and a respective reflecting optical element.

14. The device according to claim 13, wherein each reflecting optical element is rotatable around a respective rotation centre, independently of the remaining sections.

15. A system for acquiring images comprising an image-acquiring device, said image-acquiring device comprising an optical sensor and an objective lens that is suitable for forming an image on said optical sensor, the system further comprising an illuminating device according to claim 1.

16. The system according to claim 15, wherein said optical sensor is orientable on a lying plane thereof, by rectilinear movement and/or rotation on said lying plane.

17. A method for aligning a system for acquiring optically encoded information, said system comprising an image-acquiring device and an illuminating device, said image-acquiring device comprising an optical sensor and an objective lens that is suitable for forming an image on said optical sensor said method comprising the steps of:
   illuminating with a light beam, produced by said illuminating device by at least one light source thereof, a support suitable for spreading said light beam;
   forming an image of said support on said optical sensor;
   detecting a light intensity of said image, by said optical sensor, and rotating a reflecting optical element of said illuminating device associated with said at least one light source around a rotation centre placed within an area surrounding at least one first focus of said reflecting optical element until said light intensity is maximized, wherein said rotation centre is arranged at a distance from said first focus that is not greater than ⅟₂₅ of the distance between said first focus and a second focus of said reflecting optical element.

18. The method according to claim 17, wherein said illuminating element is divided into a plurality of sections with each of which a respective light source and a respective reflecting optical element are associated, said rotating comprising rotating each reflecting optical element independently of the other reflecting optical elements.

19. The method according to claim 18, wherein said rotating each reflecting optical element occurs with all said light sources switched on.

20. The method according to claim 18, wherein said rotating each reflecting optical element occurs with only the light source that is associated with the reflecting optical element that is rotated switched on.

21. The method according to claim 17, further comprising the step of using said light intensity as a feedback signal to control said rotating.

22. The method according to claim 17, further comprising the step of orientating said optical sensor in a lying plane thereof, until said light intensity is maximized.

* * * * *